G. MITCHELL.
APPARATUS FOR DESHELLING SEEDS HAVING HARD SHELLS.
APPLICATION FILED NOV. 1, 1920.

1,411,177.

Patented Mar. 28, 1922.

Inventor
George Mitchell
by Bakewell, Byrnes, Parmelee
his Attys.

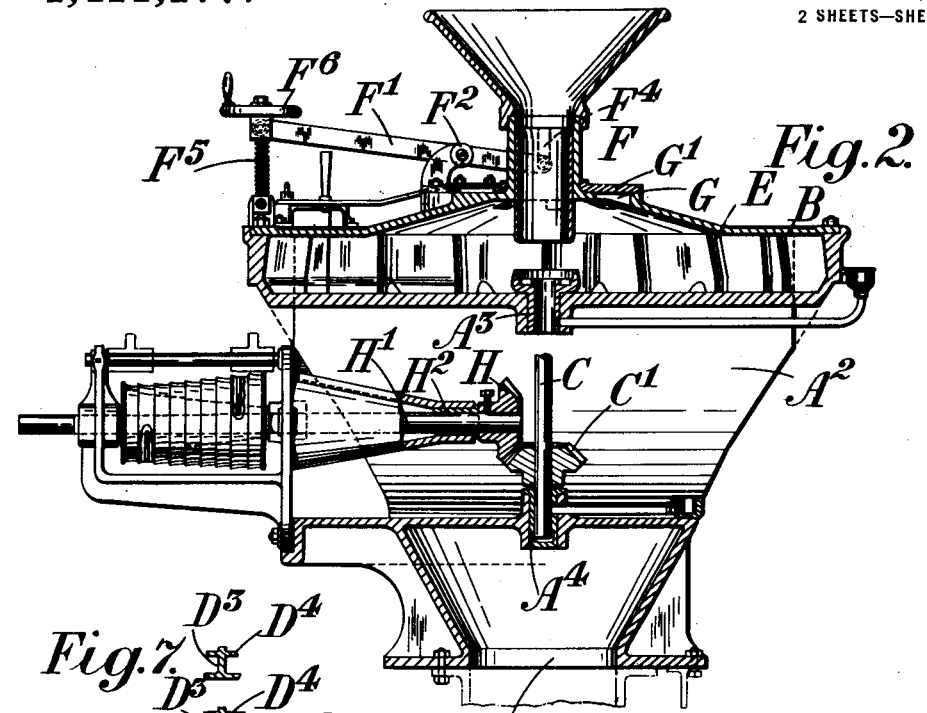
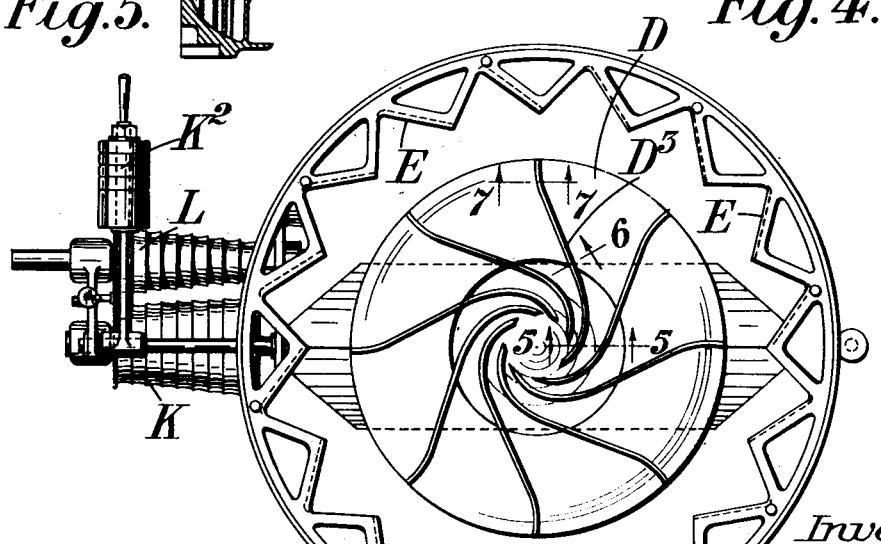

UNITED STATES PATENT OFFICE.

GEORGE MITCHELL, OF LONDON, ENGLAND.

APPARATUS FOR DESHELLING SEEDS HAVING HARD SHELLS.

1,411,177. Specification of Letters Patent. Patented Mar. 28, 1922.

Application filed November 1, 1920. Serial No. 420,957.

*To all whom it may concern:*

Be it known that I, GEORGE MITCHELL, a subject of the King of England, residing at London, England, have invented certain new and useful Improvements in Apparatus for Deshelling Seeds Having Hard Shells, of which the following is a specification.

This invention relates to apparatus for deshelling seeds having hard shells, and it has for its main object to provide an improved construction of apparatus wherein such seeds can be deshelled by causing them to impact upon hard surfaces. Another object is to provide that when the shells are cracked and separated from the kernels, a blast of air in the apparatus shall cause the fragments of shell to be blown away from the kernels.

According to this invention, apparatus for deshelling seeds having hard shells comprises the combination of rotatory means, for example a bladed rotatory impeller, for throwing through the air seeds fed thereto, driving-means, preferably variable-speed driving-means, for rotating the rotatory means, and a wall having a hard face or faces arranged to be impacted by the seeds in their flight through the air and situated each at right-angles or substantially at right-angles to the line of flight of the seeds that impact thereon, for the purpose of cracking the shells of the seeds by percussion, said faces being preferably tilted for a purpose hereinafter described.

Conveniently, when the apparatus has a bladed rotatory impeller, a housing surrounds the impeller, and is provided with an air-inlet situated near the inner ends of the blades of the impeller, and means, for example a valve, is provided for closing and opening said inlet, in order that air may be impelled with the seeds by the impeller for producing a blast for separating the cracked shells from the kernels of the seeds.

Preferably, adjustable feeding means, for example a feed-hopper having a telescopically adjustable outlet is provided for feeding seed to the centre of the impeller, for enabling the feeding of the seeds to the impeller to be regulated.

A bladed rotatory cellular impeller may be used in the form of a disc having a central conical portion on its operative face which is provided with blades extending from the circumference of the disc to the said central portion, the upper outer portions of which blades are connected together by an annulus to form cells which open at one end at the circumference of the disc and at the other between the inner portions of the blades.

Preferably with a bladed rotary cellular impeller, in which an annulus connects the upper outer portions of the blades to form cells, the blades extend above the annulus, and a shaped cover plate is arranged in close relation to the upper edges of said blades to form an upper set of air cells to produce an air blast as near the top of the chamber as possible to drive the seeds downwards.

The apparatus may comprise a hopper-like casing having an upstanding rim at the top thereof provided with the aforesaid faces, a horizontal tubular chamber extending diametrically across the casing, a vertical shaft journalled in the centre of the casing in the upper and lower walls of said chamber and carrying the impeller on its upper end, a cover shaped to conform to the impeller and carrying a feed hopper, which cover is detachably mounted on said rim, and driving means extending into said chamber and engaging therein with said shaft.

One preferred form of apparatus will now be described by way of example, with the aid of the accompanying drawings, in which:

Figure 2 is a central sectional elevation through the apparatus at right angles to Figure 1 and with the impeller removed;

Figure 4 is a plan view with the cover plate removed, showing the impeller in position;

Figures 5-7 are fragmentary sectional views of the impeller on the lines 5—5, 6—6 and 7—7 respectively of Figure 4.

Like reference letters indicate like parts in all the figures.

Figure 1:
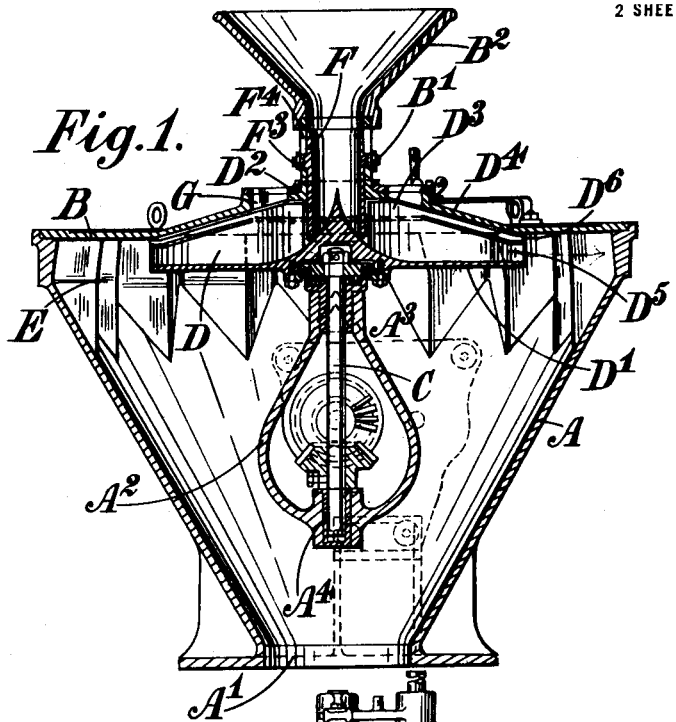
Figure 1 is a central sectional elevation through the apparatus.
Figure 3:
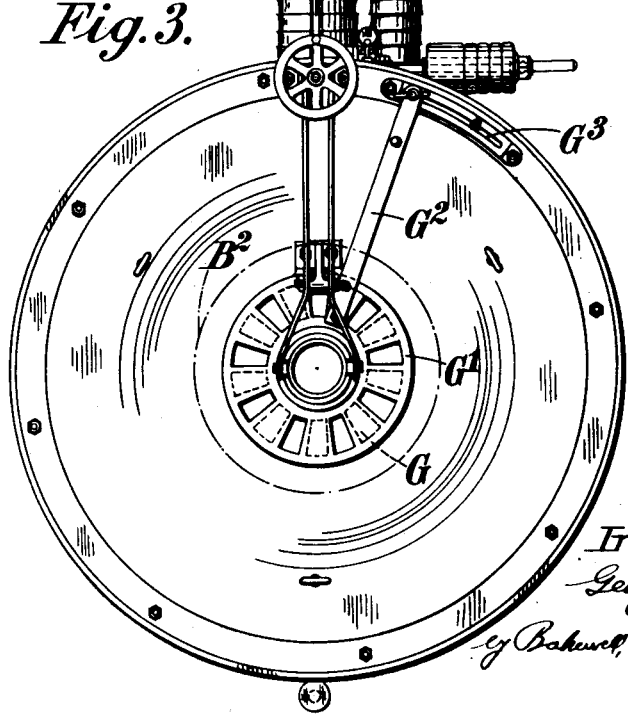
Figure 3 is a plan view of Figure 1 with the hopper removed.

A hopper-shaped casing A of cast-iron or other convenient material having an outlet $A^1$ at its bottom end and having a detachable cover B contains a tubular chamber $A^2$, which extends diametrically across the casing and carries in its upper and lower walls respectively bearings $A^3$ and $A^4$. A vertical shaft C is journalled in these bearings and carries on its upper end a bladed impeller D situated just below the cover of the casing.

The impeller consists of a disc $D^1$ having on its upper face a central conical portion $D^2$ and ribs $D^3$ constituting blades. These blades are curved somewhat in the form of an S, and extend from the circumference of the disc to the base of the cone in the centre thereof. The upper portions of the volute blades are connected together from their outer ends to about the middle of their length by an annulus $D^4$, whereby a number of cells $D^5$ are formed which open each at the circumference of the disc, and between the inner portions of the blades. The curvature of each blade at its inner end is greater than that at the circumference of the impeller, where the end portion of each blade is directed approximately radially. Further, each blade is shallower at its outer end than at its inner end which is situated at the lower part of the central cone. Moreover, the ribs $D^3$ extend slightly above the annulus $D^4$ and so form a second set of cells $D^6$ immediately beneath the shaped cover plate B.

In some cases it may be advantageous to extend the annulus $D^4$ to the valve surrounding the central cone of the impeller, the upper set of cells $D^6$ would then provide the main air blast, acting upon the seed after it has left the impeller.

The inner periphery of the casing surrounding the impeller is not curved at the level of the impeller, but has a series of flat faces E set each at right-angles or approximately at right-angles to a tangent drawn in the direction of rotation of the impeller from the circumference thereof to the centre of each face. In order that the fragments of shell and the kernels shall not rebound off the wall of the casing back against the impeller, the said flat faces E are preferably not quite vertical, but are tilted forward slightly, as shown, at such an angle that the shells and kernels, in rebounding from the faces are directed below the impeller.

The cover B of the casing conforms in shape to that of the top of the impeller blades and has a central feed-conduit $B^1$, which carries at its outer end a feed-hopper $B^2$ and its delivery end is situated vertically above the aforesaid cone $D^2$ at the centre of the impeller. Within the feed-conduits $B^1$ is a sleeve-valve F, which can be seated on the cone $D^2$ or lifted therefrom by any convenient means. Such means may conveniently take the form of a lever $F^1$ that is fulcrumed on the cover at $F^2$ and has a forked end engaging trunnions $F^3$ that are provided on the sleeve valve and extend through slots $F^4$ in the feed-conduit. The other end of the lever may conveniently be adjusted in position by means of a screw $F^5$ mounted on the outer periphery of the cover and fitted with a hand-wheel $F^6$.

A series of apertures G is arranged in a circle in the cover around the feed-conduit. These apertures are situated vertically above the spaces between the inner ends of the blades of the impeller and allow air to be induced into the casing when the impeller is rotated for producing a blast in the casing for separating the fragments of shell from the kernels. A rotatory disc valve $G^1$ is mounted on the cover to regulate the blast, and has a handle $G^2$ that extends to the circumference of the cover to which it can be locked in any desired position by a pin-and-slot connection $G^3$.

Any convenient driving means may be provided for driving the impeller. Such means are, however, preferably adjustable for varying the speed. Conveniently, the vertical shaft C carries a bevel-gear $C^1$ which meshes with a bevel-gear H that is fast on the inner end of a driving shaft $H^1$ that is journalled in a bearing $H^2$ mounted on the wall of the casing and extends into the aforesaid tubular chamber $A^2$. The outer end of the driving shaft may carry step pulleys K arranged to be frictionally engaged by means of a jockey roller $K^1$ carried on a sliding weighted lever $K^2$, with a second set of step pulleys L driven in any convenient manner.

The operation of the apparatus is as follows:—

The seed to be deshelled is fed into the hopper $B^2$ and falls onto the rotating impeller D from which it is thrown at a suitable velocity against the hard faces E whereon the shells are cracked by percussion, and the kernels liberated therefrom fall through the outlet $A^1$ at the bottom of the casing. Owing to the blast caused by the impeller the fragments of shell are blown away and separated from the kernels and can be drawn away from the casing at the bottom through a suitable conduit connected thereto.

When castor seed is being deshelled it has been found by experiment that if the seed has a velocity of fourteen feet per second, on striking the hard surface the shell will be ruptured and the kernel will drop out uninjured. If the velocity is in excess of the speed required, then the shell is shattered and forced into the bruised kernel, on the other hand, if the speed is below the velocity required, then the seed will rebound without the shell being cracked. By adjusting the speed of rotation of the impeller, the rate of the feed of the seed, and the amount of air admitted to the impeller, the conditions for cracking the shells of any seed and separating them from the kernels can be adjusted in such a manner that the shells are ruptured and separated without the shells being forced into the kernels, so that the kernels are not bruised. It will be apparent that seeds of the same kind, but of different size can be conveniently deshelled in this manner at the same time in one apparatus. If it is found that a portion of the cracked shells remains adhering to the kernels, screening or even hand picking on a band conveyor may be adopted to ensure that the kernels shall be entirely free from shell.

What I claim as my invention and desire to secure by Letters Patent is:—

1. In apparatus for deshelling seeds having hard shells, the combination with a rotary impeller in the form of a disc having volute blades with substantially radial tips, and means for supplying seeds into the region of the center of said impeller whereby they will be discharged by centrifugal action at the periphery thereof as the impeller is rotated, of means for producing a current of air substantially the whole of which flows downwards past said periphery and around the same, and a surrounding wall having a series of hard, flat, internal impact-faces arranged at an angle one to another and so as to intercept seeds discharged by the impeller, each of which faces is inclined so as to deflect the seeds, impacting upon it, in a downward direction away from the impeller, substantially as described.

2. In apparatus for deshelling seeds having hard shells, the combination with a rotary impeller in the form of a disc having volute blades extending substantially from the center to the circumference thereof, and having substantially radial tips, and means for supplying seeds to the region of the center of said impeller whereby the seeds will be discharged by centrifugal action at the periphery thereof, of a surrounding wall having a series of hard, flat, internal impact-faces arranged at an angle one to another and so as to intercept seeds discharged by the impeller, each of which faces is inclined so as to deflect the seeds, impacting upon it, in a downward direction away from the impeller, an annulus inter-connecting said blades at a level below their upper edges to form cells for the seeds beneath the annulus, and a cover-plate on said wall shaped to conform to the said upper edges of the blades, the upper portions of which blades decrease in height from the center of the impeller towards the periphery thereof and together with said annulus and said cover-plate constitute means for producing a current of air substantially the whole of which is compelled to flow downwards past the outlets of said cells, substantially as described.

3. Apparatus for deshelling seeds having hard shells comprising, in combination, a rotary impeller in the form of a disc having volute blades extending substantially from the center to the circumference thereof, an annulus inter-connecting said blades at a level below their upper edges to form cells beneath the annulus, means for supplying seeds to the inner ends of said cells whereby the seeds will be discharged by centrifugal action at the outer ends of the cells, a housing surrounding the impeller and cooperating with the upper edges of the volute blades to form means for inducing a downward current of air past the discharge outlets of the said cells, an air inlet in the housing situated near the inner ends of the cells, means for opening and closing said air inlet, and a wall having a series of hard impact faces surrounding the periphery of the impeller and against which the seeds will impact in their flight from said periphery, substantially as described.

4. Apparatus for deshelling seeds having hard shells comprising in combination a rotary impeller in the form of a disk having volute blades decreasing in depth substantially from the center to the periphery of said disk, a conical annulus interconnecting said blades at a level below their upper edges to form cells beneath the annulus and decreasing in depth from the center towards the periphery of the impeller, means for supplying seeds to the inner ends of said cells, whereby the seeds will be discharged by centrifugal action at the outer ends of the cells, a conically shaped cover plate arranged above the upper edges of the volute blades and co-operating with the portions of the blades above the annulus to form cells through which a current of air is induced by centrifugal action to pass downwards from the center to the periphery of the impeller, and a wall surrounding the impeller and having a series of hard faces each of which is inclined so as to deflect the seeds, impacting upon it, in a downward direction away from the impeller.

5. Apparatus for deshelling seeds having hard shells comprising in combination a rotary impeller in the form of a disk having volute blades extending substantially from the center to the circumference thereof, an annulus interconnecting said blades at a level below their upper edges to form cells beneath the annulus, means for supplying seeds to the inner ends of said cells whereby the seeds will be discharged by centrifugal action at the outer ends of the cells, a housing surrounding the impeller and cooperating with the upper edges of the volute blades to form means for inducing a downward current of air past the discharge outlets of the cells aforesaid, an air inlet in the housing situated near the inner ends of the cells, means for opening and closing said air inlet, and a wall having a series of hard impact faces surrounding the periphery of the impeller each of which is inclined so as to deflect the seeds impacting upon it in a downward direction away from the impeller.

6. Apparatus for deshelling seeds having hard shells comprising in combination a rotary impeller, a central conical portion on said impeller, a feed hopper cooperating with said conical portion to form adjustable means for feeding seeds to the impeller and for evenly distributing the seeds, means for producing a downward current of air past the discharge edge of the impeller, and a wall surrounding the impeller and having a series of hard impact faces each of which is inclined so as to deflect the seeds impacting upon it in a downward direction away from the impeller.

7. Apparatus for deshelling seeds having hard shells comprising in combination a rotary impeller in the form of a disk having on its operative face a central conical portion and a series of volute blades extending from the circumference of the disk to said central portion, an annulus interconnecting said blades at a level below their upper edges to form cells beneath the annulus, a feed hopper cooperating with said central conical portion to form adjustable means for feeding seeds to the inner end of said cells, and for evenly distributing the seeds whereby the seeds will be discharged by centrifugal action at the outer ends of the cells, a shaped cover plate cooperating with the upper edges of the volute blades to form means for inducing a downward current of air past the discharge outlets of the cells aforesaid, and a wall having a series of hard impact faces surrounding the periphery of the impeller each of which is inclined so as to deflect the seeds impacting upon it in a downward direction away from the impeller.

8. Apparatus for deshelling seeds having hard shells comprising in combination a rotary impeller in the form of a disk having on its operative force a central conical portion and a series of volute blades decreasing in depth substantially from said central portion to the periphery of the disk, a conical annulus interconnecting said blades at a level below their upper edges to form cells beneath the annulus and decreasing in depth from the center towards the periphery of the impeller, a feed hopper cooperating with the central conical portion aforesaid to form adjustable means for feeding seeds to the inner ends of the impeller cells whereby the seeds will be discharged by centrifugal action at the outer ends of the cells, a conically shaped cover plate arranged above the upper edges of the volute blades and cooperating with the portions of the blades above the annulus aforesaid to form induced draught air passages, an air inlet in the cover plate near the inner ends of the cells, means for opening and closing said air inlet, and a wall surrounding the impeller and having a series of hard faces arranged to be impacted by the seeds in their flight through the air, and situated each substantially at right angles to the line of flight of the seeds that impact thereon, which faces are downwardly inclined.

In testimony whereof I affix my signature.

GEORGE MITCHELL.